US007842777B2

(12) United States Patent
DeBruin et al.

(10) Patent No.: US 7,842,777 B2
(45) Date of Patent: *Nov. 30, 2010

(54) SLOPED TUBULAR REACTOR WITH DIVIDED FLOW

(75) Inventors: Bruce Roger DeBruin, Lexington, SC (US); Michael Paul Ekart, Kingsport, TN (US); Larry Cates Windes, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 623 days.

This patent is subject to a terminal disclaimer.

(21) Appl. No.: 11/776,600

(22) Filed: Jul. 12, 2007

(65) Prior Publication Data

US 2009/0016940 A1 Jan. 15, 2009

(51) Int. Cl.
  C08G 63/02 (2006.01)
  C08G 63/00 (2006.01)
(52) U.S. Cl. .................... 528/308.1; 422/129; 422/131; 422/137; 422/138; 526/64; 528/171; 528/176; 528/271; 528/272
(58) Field of Classification Search ................ 422/129, 422/131, 137, 138; 526/64; 528/171, 176, 528/271, 272, 308.1
See application file for complete search history.

(56) References Cited

U.S. PATENT DOCUMENTS

| 1,422,182 | A | 7/1922 | Curme |
|---|---|---|---|
| 2,361,717 | A | 10/1944 | Taylor |
| 2,614,648 | A | 10/1952 | Wilson |
| 2,709,642 | A | 5/1955 | Mann, Jr. et al. |
| 2,727,882 | A | 12/1955 | Vodonik |
| 2,753,249 | A | 7/1956 | Idenden et al. |
| 2,820,815 | A | 1/1958 | Matuszak et al. |
| 2,829,153 | A | 4/1958 | Vodonik |
| 2,905,707 | A | 9/1959 | Hurt et al. |
| 2,973,341 | A | 2/1961 | Hippe et al. |
| 3,044,993 | A | 7/1962 | Tiemersma |
| 3,052,711 | A | 9/1962 | Glogau et al. |
| 3,054,776 | A | 9/1962 | Higgins |
| 3,110,547 | A | 11/1963 | Emmert |
| 3,113,843 | A | 12/1963 | Li |
| 3,161,710 | A | 12/1964 | Turner |
| 3,174,830 | A | 3/1965 | Watzl et al. |
| 3,185,668 | A | 5/1965 | Meyer et al. |
| 3,192,184 | A | 6/1965 | Brill et al. |
| 3,241,926 | A | 3/1966 | Parker et al. |
| 3,250,747 | A | 5/1966 | Mitchell, Jr. et al. |
| 3,251,657 | A | 5/1966 | Bachmann et al. |
| 3,254,965 | A | 6/1966 | Ogle |
| 3,376,353 | A | 4/1968 | Tate |
| 3,385,881 | A | 5/1968 | Bachmann et al. |
| 3,390,965 | A | 7/1968 | Ditmar |
| 3,402,023 | A | 9/1968 | Dobo |
| 3,427,287 | A | 2/1969 | Pengilly |
| 3,438,942 | A | 4/1969 | Scheller |
| 3,442,868 | A | 5/1969 | Ogata et al. |
| 3,458,467 | A | 7/1969 | Herrie et al. |
| 3,468,849 | A | 9/1969 | Rothert |
| 3,480,587 | A | 11/1969 | Porter |
| 3,487,049 | A | 12/1969 | Busot |
| 3,496,146 | A | 2/1970 | Mellichamp, Jr. |
| 3,496,159 | A | 2/1970 | Spence |
| 3,496,220 | A | 2/1970 | McCarty et al. |
| 3,497,473 | A | 2/1970 | Kemkes |
| 3,507,905 | A | 4/1970 | Girantet et al. |
| 3,509,203 | A | 4/1970 | Michaelis et al. |
| 3,511,615 | A | 5/1970 | Roget et al. |
| 3,522,214 | A | 7/1970 | Crawford et al. |
| 3,534,082 | A | 10/1970 | Armstrong et al. |
| 3,551,396 | A | 12/1970 | Lanthier |
| 3,582,244 | A | 6/1971 | Siclari et al. |
| 3,590,070 | A | 6/1971 | Martin et al. |
| 3,590,072 | A | 6/1971 | Leybourne |
| 3,595,846 | A | 7/1971 | Rouzier |
| 3,600,137 | A | 8/1971 | Girantet et al. |
| 3,609,125 | A | 9/1971 | Fujimoto et al. |
| 3,639,448 | A | 2/1972 | Matsuzawa et al. |
| 3,644,096 | A | 2/1972 | Lewis et al. |
| 3,644,294 | A | 2/1972 | Siclari et al. |
| 3,644,483 | A | 2/1972 | Griehl et al. |

(Continued)

FOREIGN PATENT DOCUMENTS

BE 780142 3/1972

(Continued)

OTHER PUBLICATIONS

Copending U.S. Appl. No. 11/506,105, filed Aug. 17, 2006, Bruce Roger DeBruin.

(Continued)

*Primary Examiner*—Terressa M Boykin
(74) *Attorney, Agent, or Firm*—Jennifer R. Knight; Bernard J. Graves, Jr.

(57) ABSTRACT

A sloped tubular reactor operable to facilitate a chemical reaction in a reaction medium flowing therethrough. The reactor can include a downwardly sloped tubular member, a flow divider disposed in the tubular member, and one or more internal trays disposed in the tubular member. The flow divider divides flow of the reaction medium among the trays and the bottom of the tubular member.

60 Claims, 4 Drawing Sheets

U.S. PATENT DOCUMENTS

| | | |
|---|---|---|
| 3,646,102 A | 2/1972 | Kobayashi et al. |
| 3,647,758 A | 3/1972 | Ryffel et al. |
| 3,651,125 A | 3/1972 | Lewis et al. |
| 3,676,485 A | 7/1972 | Lewis et al. |
| 3,684,459 A | 8/1972 | Tate et al. |
| 3,689,461 A | 9/1972 | Balint et al. |
| 3,697,579 A | 10/1972 | Balint et al. |
| 3,723,391 A | 3/1973 | Beer et al. |
| 3,740,267 A | 6/1973 | Haylock et al. |
| 3,781,213 A | 12/1973 | Siclari et al. |
| 3,787,479 A | 1/1974 | Grehl et al. |
| 3,819,585 A | 6/1974 | Funk et al. |
| 3,841,836 A | 10/1974 | Lunsford et al. |
| 3,849,379 A | 11/1974 | Jeurissen et al. |
| 3,867,349 A | 2/1975 | Heeg et al. |
| 3,892,798 A | 7/1975 | Heeg et al. |
| 3,927,982 A | 12/1975 | Chapman et al. |
| 3,927,983 A | 12/1975 | Gordon et al. |
| 3,960,820 A | 6/1976 | Pinney |
| 3,988,301 A | 10/1976 | Jeurissen et al. |
| 4,001,187 A | 1/1977 | Itabashi et al. |
| 4,008,048 A | 2/1977 | Hellemans et al. |
| 4,019,866 A | 4/1977 | Jaswal et al. |
| 4,020,049 A | 4/1977 | Rinehart |
| 4,028,307 A | 6/1977 | Ure |
| 4,032,563 A | 6/1977 | Harper et al. |
| 4,039,515 A | 8/1977 | Rebhan et al. |
| 4,046,718 A | 9/1977 | Mass et al. |
| 4,049,638 A | 9/1977 | Doerfel et al. |
| 4,056,514 A | 11/1977 | Strehler et al. |
| 4,064,112 A | 12/1977 | Rothe et al. |
| 4,077,945 A | 3/1978 | Heinze et al. |
| 4,079,046 A | 3/1978 | Brignac et al. |
| 4,089,888 A | 5/1978 | Tokumitsu et al. |
| 4,097,468 A | 6/1978 | James et al. |
| 4,100,142 A | 7/1978 | Schaefer et al. |
| 4,110,316 A | 8/1978 | Edging et al. |
| 4,118,582 A | 10/1978 | Walker |
| 4,122,112 A | 10/1978 | Koda et al. |
| 4,146,729 A | 3/1979 | Goodley et al. |
| 4,148,693 A | 4/1979 | Williamson |
| 4,196,168 A | 4/1980 | Lewis |
| 4,200,145 A | 4/1980 | Underwood |
| 4,204,070 A | 5/1980 | Suzuki et al. |
| 4,212,963 A | 7/1980 | Lehr et al. |
| 4,223,124 A | 9/1980 | Broughton et al. |
| 4,230,818 A | 10/1980 | Broughton, Jr. et al. |
| 4,235,844 A | 11/1980 | Sterzel et al. |
| 4,238,593 A | 12/1980 | Duh |
| 4,254,246 A | 3/1981 | Dicoi et al. |
| 4,289,871 A | 9/1981 | Rowan et al. |
| 4,289,895 A | 9/1981 | Burkhardt et al. |
| 4,339,570 A | 7/1982 | Muschelknautz et al. |
| 4,346,193 A | 8/1982 | Warfel |
| 4,361,462 A | 11/1982 | Fujii et al. |
| 4,365,078 A | 12/1982 | Shelley |
| 4,382,139 A | 5/1983 | Kapteina et al. |
| 4,383,093 A | 5/1983 | Shiraki et al. |
| 4,410,750 A | 10/1983 | Langer, Jr. |
| 4,424,301 A | 1/1984 | Klippert et al. |
| 4,440,924 A | 4/1984 | Kuze et al. |
| 4,452,956 A | 6/1984 | Moked et al. |
| 4,472,558 A | 9/1984 | Casper et al. |
| 4,499,226 A | 2/1985 | Massey et al. |
| 4,529,787 A | 7/1985 | Schmidt et al. |
| 4,542,196 A | 9/1985 | Morris et al. |
| 4,548,788 A | 10/1985 | Morris et al. |
| 4,550,149 A | 10/1985 | Morris et al. |
| 4,551,309 A | 11/1985 | Morris et al. |
| 4,551,510 A | 11/1985 | Morris et al. |
| 4,554,343 A | 11/1985 | Jackson, Jr. et al. |
| 4,555,384 A | 11/1985 | Morris et al. |
| 4,588,560 A | 5/1986 | Degnan et al. |
| 4,612,363 A | 9/1986 | Sasaki et al. |
| 4,670,580 A | 6/1987 | Maurer |
| 4,675,377 A | 6/1987 | Mobley et al. |
| 4,680,345 A | 7/1987 | Kobayashi et al. |
| 4,680,376 A | 7/1987 | Heinze et al. |
| 4,721,575 A | 1/1988 | Binning et al. |
| 4,952,302 A | 8/1990 | Leach |
| 4,952,627 A | 8/1990 | Morita et al. |
| 4,973,655 A | 11/1990 | Pipper et al. |
| 5,002,116 A | 3/1991 | Hoagland et al. |
| 5,037,955 A | 8/1991 | Dighton |
| 5,041,525 A | 8/1991 | Jackson |
| 5,064,935 A | 11/1991 | Jackson et al. |
| 5,110,325 A | 5/1992 | Lerner |
| 5,162,488 A | 11/1992 | Mason |
| 5,185,426 A | 2/1993 | Verheijen et al. |
| 5,194,525 A | 3/1993 | Miura et al. |
| 5,202,463 A | 4/1993 | Ruszkay |
| 5,236,558 A | 8/1993 | Buyalos et al. |
| 5,243,022 A | 9/1993 | Kim et al. |
| 5,245,057 A | 9/1993 | Shirtum |
| 5,254,288 A | 10/1993 | Verheijen et al. |
| 5,294,305 A | 3/1994 | Craft, Sr. et al. |
| 5,300,626 A | 4/1994 | Jehl et al. |
| 5,324,853 A | 6/1994 | Jones et al. |
| 5,340,906 A | 8/1994 | Shirokura et al. |
| 5,340,907 A | 8/1994 | Yau et al. |
| 5,384,389 A | 1/1995 | Alewelt et al. |
| 5,385,773 A | 1/1995 | Yau et al. |
| 5,413,861 A | 5/1995 | Gallo |
| 5,434,239 A | 7/1995 | Bhatia |
| 5,464,590 A | 11/1995 | Yount et al. |
| 5,466,419 A | 11/1995 | Yount et al. |
| 5,466,765 A | 11/1995 | Haseltine et al. |
| 5,466,776 A | 11/1995 | Krautstrunk et al. |
| 5,476,919 A | 12/1995 | Shaeffer |
| 5,478,909 A | 12/1995 | Jehl et al. |
| 5,480,616 A | 1/1996 | Richardson et al. |
| 5,484,882 A | 1/1996 | Takada et al. |
| 5,496,469 A | 3/1996 | Scraggs et al. |
| 5,519,112 A | 5/1996 | Harazoe et al. |
| 5,536,856 A | 7/1996 | Harrison et al. |
| 5,573,820 A | 11/1996 | Harazoe et al. |
| 5,594,077 A | 1/1997 | Groth et al. |
| 5,599,900 A | 2/1997 | Bhatia |
| 5,602,216 A | 2/1997 | Juvet |
| 5,648,437 A | 7/1997 | Fischer et al. |
| 5,650,536 A | 7/1997 | Dankworth et al. |
| 5,681,918 A | 10/1997 | Adams et al. |
| 5,688,898 A | 11/1997 | Bhatia |
| 5,739,219 A | 4/1998 | Fischer et al. |
| 5,750,079 A | 5/1998 | Ueda et al. |
| 5,753,190 A | 5/1998 | Haseltine et al. |
| 5,753,784 A | 5/1998 | Fischer et al. |
| 5,786,443 A | 7/1998 | Lowe |
| 5,811,496 A | 9/1998 | Iwasyk et al. |
| 5,816,700 A | 10/1998 | Starke, Sr. et al. |
| 5,830,981 A | 11/1998 | Koreishi et al. |
| 5,849,849 A | 12/1998 | Bhatia |
| 5,889,127 A | 3/1999 | Iiyama et al. |
| 5,898,058 A | 4/1999 | Nichols et al. |
| 5,902,865 A | 5/1999 | Gausepohl et al. |
| 5,905,096 A | 5/1999 | Lay et al. |
| 5,922,828 A | 7/1999 | Schiraldi |
| 5,932,105 A | 8/1999 | Kelly |
| 6,069,228 A | 5/2000 | Alsop et al. |
| 6,096,838 A | 8/2000 | Nakamoto et al. |
| 6,100,369 A | 8/2000 | Miyajima et al. |
| 6,103,859 A | 8/2000 | Jernigan et al. |
| 6,111,035 A | 8/2000 | Sakamoto et al. |
| 6,111,064 A | 8/2000 | Maurer et al. |

| | | | | | | |
|---|---|---|---|---|---|---|
| 6,113,997 | A | 9/2000 | Massey et al. | GB | 1055918 | 1/1967 |
| 6,127,493 | A | 10/2000 | Maurer et al. | GB | 1122538 | 8/1968 |
| 6,174,970 | B1 | 1/2001 | Braune | GB | 1154538 | 6/1969 |
| 6,252,034 | B1 | 6/2001 | Uenishi et al. | GB | 1 277 376 | 6/1972 |
| 6,339,031 | B1 | 1/2002 | Tan | GB | 1320769 | 6/1973 |
| 6,355,738 | B2 | 3/2002 | Nakamachi | GB | 2010294 | 6/1979 |
| 6,359,106 | B1 | 3/2002 | Nakamoto et al. | GB | 2020194 | 11/1979 |
| 6,399,031 | B1 | 6/2002 | Herrmann et al. | GB | 2 052 535 | 1/1981 |
| 6,458,916 | B1 | 10/2002 | Yamaguchi et al. | GB | 2052535 | 1/1981 |
| 6,545,176 | B1 | 4/2003 | Tsay et al. | JP | 42 4993 B | 3/1967 |
| 6,551,517 | B1 | 4/2003 | Sentagnes et al. | JP | 42 18353 B | 9/1967 |
| 6,576,774 | B2 | 6/2003 | Scardino et al. | JP | 47 39043 A | 4/1971 |
| 6,590,062 | B2 | 7/2003 | Yamaguchi et al. | JP | 48 94795 A | 12/1973 |
| 6,623,643 | B2 | 9/2003 | Chisholm et al. | JP | 49 28698 A | 3/1974 |
| 6,631,892 | B1 | 10/2003 | Erickson | JP | 49 34593 A | 3/1974 |
| 6,642,407 | B2 | 11/2003 | Rao et al. | JP | 49 105893 A | 10/1974 |
| 6,703,454 | B2 | 3/2004 | Debruin | JP | 50 82197 A | 7/1975 |
| 6,723,826 | B2 | 4/2004 | Yamaguchi et al. | JP | 51 29460 A | 3/1976 |
| 6,814,944 | B1 | 11/2004 | Matsui et al. | JP | 51 100036 A | 9/1976 |
| 6,815,525 | B2 | 11/2004 | Debruin | JP | 51 136788 A | 11/1976 |
| 6,861,494 | B2 | 3/2005 | Debruin | JP | 51 136789 A | 11/1976 |
| 6,906,164 | B2 | 6/2005 | Debruin | JP | 52 51495 A | 4/1977 |
| 6,916,939 | B2 | 7/2005 | Yamane et al. | JP | 52 71432 A | 6/1977 |
| 7,008,546 | B2 | 3/2006 | Edmondson | JP | 52 78845 A | 7/1977 |
| 7,049,462 | B2 | 5/2006 | Nagare et al. | JP | 52 83424 A | 7/1977 |
| 7,074,879 | B2 | 7/2006 | Debruin et al. | JP | 52 87133 A | 7/1977 |
| 7,658,817 | B2 | 2/2010 | Fukuoka et al. | JP | 53 31793 A | 3/1978 |
| 2002/0128399 | A1 | 9/2002 | Nakamoto et al. | JP | 53 34894 A | 3/1978 |
| 2002/0161166 | A1 | 10/2002 | Nakane et al. | JP | 54 41833 A | 4/1979 |
| 2002/0180099 | A1 | 12/2002 | Keillor, III | JP | 54 76535 A | 6/1979 |
| 2003/0037910 | A1 | 2/2003 | Smymov | JP | 54 79242 A | 6/1979 |
| 2003/0104203 | A1 | 6/2003 | Tam et al. | JP | 54 100494 A | 8/1979 |
| 2003/0133856 | A1 | 7/2003 | Le | JP | 54 157536 A | 12/1979 |
| 2003/0191326 | A1 | 10/2003 | Yamane et al. | JP | 55 43128 A | 3/1980 |
| 2004/0068070 | A1 | 4/2004 | Martan et al. | JP | 55 108422 A | 8/1980 |
| 2004/0197618 | A1 | 10/2004 | Harada et al. | JP | 55 135133 A | 10/1980 |
| 2004/0249111 | A1 | 12/2004 | Debruin et al. | JP | 58 129020 A | 8/1983 |
| 2005/0059782 | A1 | 3/2005 | Andrist et al. | JP | 59 47226 A | 3/1984 |
| 2005/0222371 | A1 | 10/2005 | Wilhelm et al. | JP | 59 53530 A | 3/1984 |
| 2006/0008661 | A1 | 1/2006 | Wijesundara et al. | JP | 59 68326 A | 4/1984 |
| 2006/0251546 | A1 | 11/2006 | Yount et al. | JP | 59 71326 A | 4/1984 |
| 2006/0251547 | A1 | 11/2006 | Windes et al. | JP | 60 15421 A | 1/1985 |
| 2007/0037959 | A1 | 2/2007 | DeBruin | JP | 60 72845 A | 4/1985 |
| 2008/0139760 | A1 | 6/2008 | DeBruin | JP | 60 115551 A | 6/1985 |
| 2009/0016938 | A1* | 1/2009 | Windes et al. .............. 422/131 | JP | 60 120839 A | 6/1985 |
| | | | | JP | 60 163918 A | 8/1985 |

FOREIGN PATENT DOCUMENTS

| | | |
|---|---|---|
| JP | 60 226846 A | 11/1985 |
| JP | 62 207325 A | 9/1987 |
| BR | 7906279 | 7/1981 |
| JP | 62 292831 A | 12/1987 |
| DE | 2200832 | 1/1972 |
| JP | 64 56726 A | 3/1989 |
| DE | 125 798 | 5/1977 |
| JP | 1 102044 A | 4/1989 |
| DE | 126 073 | 6/1977 |
| JP | 3 192118 A | 8/1991 |
| DE | 146 298 | 2/1981 |
| JP | 3 292323 A | 12/1991 |
| DE | 206 558 | 2/1984 |
| JP | 5-78402 | 3/1993 |
| DE | 229 415 | 11/1985 |
| JP | 5 155994 A | 6/1993 |
| DE | 4235785 A1 | 5/1994 |
| JP | 6 247899 A | 9/1994 |
| DE | 195 25 579 | 12/1996 |
| JP | 7 118208 A | 5/1995 |
| DE | 195 37 930 | 4/1997 |
| JP | 7 173268 A | 7/1995 |
| DE | 103 36 164 A1 | 3/2005 |
| JP | 7 238151 A | 9/1995 |
| DE | 10 2004 038 466 | 10/2005 |
| JP | 7 313 865 | 12/1995 |
| DE | 10 2004 034 708 A1 | 2/2006 |
| JP | 8 198960 A | 8/1996 |
| EP | 0 070 707 A1 | 1/1983 |
| JP | 8 283398 A | 10/1996 |
| EP | 0 105 111 | 7/1983 |
| JP | 10 36495 A | 2/1998 |
| EP | 0 105 111 A1 | 7/1983 |
| JP | 10 259244 A | 9/1998 |
| EP | 0 850 962 A2 | 7/1998 |
| JP | 11 092555 A | 4/1999 |
| EP | 0 999 228 A2 | 5/2000 |
| JP | 11 106489 A | 4/1999 |
| EP | 1 065 193 A1 | 1/2001 |
| JP | 11 217429 A | 8/1999 |
| FR | 2168990 | 9/1973 |
| JP | 2000/095851 A | 4/2000 |
| FR | 2302778 A1 | 3/1975 |
| JP | 2004 238329 | 8/2004 |
| GB | 777 128 | 6/1957 |
| KR | 1993-0005144 B1 | 6/1993 |
| GB | 777 628 | 6/1957 |
| KR | 1994-0011540 B1 | 3/1994 |
| GB | 1001787 | 8/1965 |
| NL | 6704303 | 9/1967 |
| GB | 1013034 | 12/1965 |
| PL | 136188 | 8/1987 |

| | | |
|---|---|---|
| SU | 973552 | 11/1982 |
| WO | 95/29752 | 11/1995 |
| WO | WO 96/22318 | 7/1996 |
| WO | WO 98/08602 | 3/1998 |
| WO | WO 98/10007 | 3/1998 |
| WO | WO 99/16537 | 4/1999 |
| WO | 99/39815 | 8/1999 |
| WO | WO 02/26841 A1 | 4/2002 |
| WO | WO 02/46266 A2 | 6/2002 |
| WO | WO 02/096975 A1 | 12/2002 |
| WO | WO 03/006526 A1 | 1/2003 |
| WO | 2004/111104 | 12/2004 |
| WO | WO 2006 007966 A1 | 2/2006 |
| WO | WO 2006/083250 A1 | 8/2006 |
| WO | 2007/065211 | 6/2007 |
| WO | WO2007065211 A1 | 6/2007 |

OTHER PUBLICATIONS

Copending U.S. Appl. No. 11/506,099, filed Aug. 17, 2006, Bruce Roger DeBruin.
Copending U.S. Appl. No. 11/506,131, filed Aug. 17, 2006, Bruce Roger DeBruin.
Copending U.S. Appl. No. 11/506,346, filed Aug. 17, 2006, Bruce Roger DeBruin.
Copending U.S. Appl. No. 11/506,132, filed Aug. 17, 2006, Bruce Roger DeBruin.
Copending U.S. Appl. No. 11/820,244, filed Jun. 19, 2007, Bruce Roger DeBruin.
Copending U.S. Appl. No. 11/891,149, filed Aug. 9, 2007, Bruce Roger DeBruin.
Copending U.S. Appl. No. 11/635,411, filed Dec. 7, 2006, Bruce Roger DeBruin.
Copending U.S. Appl. No. 11/635,360, filed Dec. 7, 2006, Bruce Roger DeBruin.
Copending U.S. Appl. No. 11/635,448, filed Dec. 7, 2006, Bruce Roger DeBruin.
Copending U.S. Appl. No. 10/919,931, filed Aug. 17, 2004, Bruce Roger DeBruin.
Copending U.S. Appl. No. 11/776,597, filed Jul. 12, 2007, Bruce Roger DeBruin.
Copending U.S. Appl. No. 11/776,599, filed Jul. 12, 2007, Bruce Roger DeBruin et al.
Copending U.S. Appl. No. 11/776,598, filed Jul. 12, 2007, Bruce Roger DeBruin et al.
Copending U.S. Appl. No. 11/776,595, filed Jul. 12, 2007, Bruce Roger DeBruin et al.
Copending U.S. Appl. No. 11/776,587, filed Jul. 12, 2007, Bruce Roger DeBruin et al.
Copending U.S. Appl. No. 11/776,603, filed Jul. 12, 2007, Bruce Roger DeBruin et al.
Copending U.S. Appl. No. 11/776,591, filed Jul. 12, 2007, Bruce Roger DeBruin et al.
Copending U.S. Appl. No. 11/715,564, filed Mar. 8, 2007, Bruce Roger DeBruin.
Copending U.S. Appl. No. 11/715,546, filed Mar. 8, 2007, Bruce Roger DeBruin.
USPTO office action dated Sep. 6, 2005 for copending U.S. Appl. No. 10/919,931.
USPTO office action dated Apr. 10, 2006 for copending U.S. Appl. No. 10/919,931.
USPTO office action dated Oct. 23, 2006 for copending U.S. Appl. No. 10/919,931.
USPTO office action dated Jun. 14, 2007 for copending U.S. Appl. No. 11/635,411.
USPTO office action dated Jul. 2, 2007 for copending U.S. Appl. No. 11/506,131.
USPTO office action dated Jul. 2, 2007 for copending U.S. Appl. No. 11/506,132.
USPTO office action dated Jul. 2, 2007 for copending U.S. Appl. No. 11/506,105.
USPTO Notice of Allowance dated Oct. 11, 2007 for copending U.S. Appl. No. 10/919,931.
USPTO office action dated Oct. 11, 2007 for copending U.S. Appl. No. 11/820,244.
USPTO office action dated Dec. 4, 2007 for copending U.S. Appl. No. 11/891,149.
USPTO Notice of Allowance dated Jan. 10, 2008 for copending U.S. Appl. No. 11/506,131.
USPTO Office Action dated Jan. 23, 2008 for copending U.S. Appl. No. 11/635,411.
USPTO Office Action dated Jan. 31, 2008 for copending U.S. Appl. No. 11/506,132.
USPTO Office Action dated Jan. 25, 2008 for copending U.S. Appl. No. 11/506,105.
USPTO Notice of Allowance dated Feb. 13, 2008 for copending U.S. Appl. No. 11/820,244.
USPTO Notice of Allowance dated Mar. 25, 2008 for copending U.S. Appl. No. 11/506,132.
Perry, Robert H. and Green, Don, "Flow in Pipes and Channels," Perry's Chemical Engineer's Handbook, 1984, pp. 5-23, 6th Edition, McGraw-Hill, United States.
Perry, Robert H. and Green, Don, "Fluid and Particle Mechanics," Perry's Chemical Engineer's Handbook, 1984, pp. 5-40 to 5-41, 6th Edition, McGraw-Hill, United States.
Perry, Robert H. and Green, Don, "Fluid and Particle Mechanics," Perry's Chemical Engineer's Handbook, 1984, 14-82 to 14-95, 6th Edition, McGraw-Hill, United States.
Nauman, E.B., "Enhancement of Heat Transfer and Thermal Homogenity with Motionless Mixers," American Institute of Chemical Engineer's Journal, 1979, pp. 246-258, vol. 25, No. 2.
Brodkey, Robert S., "Multiphase Phenomena I: Pipe Flow," The Phenomena of Fluid Motions, 1967, pp. 456-538, Addison-Wesley Publishing Company, United States.
Gupta, S.K. and Kumar, Anil, "Polyester Reactors," Plenum Chemical Engineering Series, 1987, Chapter 8, pp. 241-318, Plenum Press, New York.
Stahl, Wegmann, Von Rohr; Tubular Reactor for Liquid Reactions with Gas Release, 2003, Catalysis Today, 79-80, pp. 89-95.
USPTO Office Action dated Aug. 20, 2008 for copending U.S. Appl. No. 11/635,411.
Copending U.S. Appl. No. 12/173,354, filed Jul. 15, 2008, Bruce Roger DeBruin.
Copending U.S. Appl. No. 12/186,739, filed Aug. 6, 2008, Bruce Roger DeBruin.
USPTO Office Action dated Jul. 18, 2008 for copending U.S. Appl. No. 11/506,346.
Ekivana, N.I. et al., "Structure Formation in Terephthalic Acid Pastes," 1968, Chemical Abstract Service, Columbus OH.
USPTO Notice of Allowance dated Apr. 29, 2008 for copending U.S. Appl. No. 11/891,149.
Office Action dated May 7, 2008 for copending U.S. Appl. No. 11/506,105.
USPTO Office Action dated May 7, 2008 for copending U.S. Appl. No. 11/506,105.
USPTO Office Action dated Sep. 22, 2008 for copending U.S. Appl. No. 11/891,149.
USPTO Notice of Allowance dated Oct. 7, 2008 for copending U.S. Appl. No. 11/506,105.
USPTO Office Action dated Dec. 5, 2008 for copending U.S. Appl. No. 12/173,354.
Santosh K. Gupta & Anil Kumar, "Step Growth Polymerization," The Plenum Chemical Engineering Series, 1987, Chapter 8, Plenum Press.
USPTO Supplemental Notice of Allowability dated Aug. 27, 2008 in copending U.S. Appl. No. 11/820,244.
USPTO Notice of Allowance dated Jun. 11, 2008 in copending U.S. Appl. No. 11/506,132.
USPTO Notice of Allowance dated Mar. 17, 2008 in copending U.S. Appl. No. 11/506,131.
USPTO Supplemental Notice of Allowability dated Apr. 4, 2008 in copending U.S. Appl. No. 11/506,131.
USPTO Notice of Allowability dated Oct. 7, 2008 in copending U.S. Appl. No. 11/506,105.
USPTO Notice of Allowance dated Jan. 2, 2009 for copending U.S. Appl. No. 11/891,149.

USPTO Notice of Allowance dated Jan. 28, 2009 for copending U.S. Appl. No. 11/506,346.
USPTO Office Action dated Jan. 30, 2009 for copending U.S. Appl. No. 11/715,546.
USPTO Office Action dated Feb. 4, 2009 for copending U.S. Appl. No. 11/635,411.
USPTO Notice of Allowance dated Apr. 14, 2009 for copending U.S. Appl. No. 11/891,149.
USPTO Office Action dated Apr. 21, 2009 for copending U.S. Appl. No. 11/635,360.
USPTO Office Action dated Apr. 21, 2009 for copending U.S. Appl. No. 11/635,448.
USPTO Office Action dated Jun. 26, 2009 for copending U.S. Appl. No. 12/173,354.
USPTO Office Action dated Jul. 23, 2009 for copending U.S. Appl. No. 11/635,411.
Notice of Allowance dated Sep. 4, 2009 for copending U.S. Appl. No. 11/635,411.
USPTO Notice of Allowance dated Nov. 17, 2009 for copending U.S. Appl. No. 12/173,354.
USPTO Office Action dated Feb. 18, 2010 for copending U.S. Appl. No. 11/776,597.
USPTO Office Action dated Feb. 18, 2010 for copending U.S. Appl. No. 11/776,599.
USPTO Office Action dated Feb. 18, 2010 for copending U.S. Appl. No. 11/776,587.
USPTO Office Action dated Feb. 18, 2010 for copending U.S. Appl. No. 11/776,603.
USPTO Office Action dated Feb. 18, 2010 for copending U.S. Appl. No. 11/776,591.
USPTO Office Action dated Feb. 24, 2010 for copending U.S. Appl. No. 11/776,598.
USPTO Office Action dated Feb. 24, 2010 for copending U.S. Appl. No. 11/776,595.
USPTO Office Action dated Jan. 11, 2010 for copending U.S. Appl. No. 11/635,360.
USPTO Office Action dated Jan. 20, 2010 for copending U.S. Appl. No. 12/186,739.
International Search Report and Written Opinion for PCT/US2008/008338, dated Oct. 23, 2008.
Perry's Chemical Engineers' Handbook, 7th Edition, pp. 8-49 to 8-50 and pp. 14-82 to 14-95, 1997, The McGraw-Hill Companies, Inc., United States.
USPTO Notice of Allowance dated Jun. 23, 2010 in copending U.S. Appl. No. 11/776,595.
USPTO Notice of Allowance dated Jun. 23, 2010 in copending U.S. Appl. No. 11/776,598.
USPTO Notice of Allowance dated Jun. 23, 2010 in copending U.S. Appl. No. 11/776,597.
USPTO Notice of Allowance dated Jun. 24, 2010 in copending U.S. Appl. No. 11/776,603.
USPTO Notice of Allowance dated Jun. 25, 2010 in copending U.S. Appl. No. 11/776,591.
USPTO Notice of Allowance dated Jun. 28, 2010 in copending U.S. Appl. No. 11/776,599.
USPTO Notice of Allowance dated Jul. 14, 2010 in copending U.S. Appl. No. 11/715,564.
USPTO Notice of Allowance dated Jul. 15, 2010 in copending U.S. Appl. No. 11/776,587.
USPTO Notice of Allowance dated Jul. 23, 2010 in copending U.S. Appl. No. 12/186,739.
USPTO Supplementary Notice of Allowance dated Sep. 21, 2010 in copending U.S. Appl. No. 11/715,564.

* cited by examiner

FIG. 7

# SLOPED TUBULAR REACTOR WITH DIVIDED FLOW

BACKGROUND OF THE INVENTION

1. Field of the Invention

This invention relates to reactors for processing liquid-containing reaction mediums. In another aspect, the invention concerns polycondensation reactors used for melt-phase production of polyesters.

2. Description of the Prior Art

Melt-phase polymerization can be used to produce a variety of polyesters, such as, for example, polyethylene terephthalate (PET). PET is widely used in beverage, food, and other containers, as well as in synthetic fibers and resins. Advances in process technology coupled with increased demand have led to an increasingly competitive market for the production and sale of PET. Therefore, a low-cost, high-efficiency process for producing PET is desirable.

Generally, melt-phase polyester production facilities, including those used to make PET, employ an esterification stage and a polycondensation stage. In the esterification stage, polymer raw materials (i.e., reactants) are converted to polyester monomers and/or oligomers. In the polycondensation stage, polyester monomers and/or oligomers exiting the esterification stage are converted into a polymer product having the desired final average chain length.

In many conventional melt-phase polyester production facilities, esterification and polycondensation are carried out in one or more mechanically agitated reactors, such as, for example, continuous stirred tank reactors (CSTRs). However, CSTRs and other mechanically agitated reactors have a number of drawbacks that can result in increased capital, operating, and/or maintenance costs for the overall polyester production facility. For example, the mechanical agitators and various control equipment typically associated with CSTRs are complex, expensive, and can require extensive maintenance.

Thus, a need exists for a high efficiency polyester process that minimizes capital, operational, and maintenance costs while maintaining or enhancing product quality.

SUMMARY OF THE INVENTION

In one embodiment of the present invention, there is provided a process comprising subjecting a reaction medium to a chemical reaction in a reactor comprising a downwardly sloped tubular member, a flow divider disposed in the tubular member, and a first tray disposed in the tubular member. The tubular member is elongated along a central axis of elongation that is oriented at a downward angle in the range of from about 5 to about 75 degrees below horizontal. The flow divider divides the reaction medium into a first portion that flows on the bottom of the tubular member and a second portion that flows on the first tray.

In another embodiment of the present invention, there is provided a process for making polyethylene terephthalate (PET), the process comprising: (a) introducing a polycondensation feed into a polycondensation reactor, wherein the polycondensation feed forms a reaction medium in the reactor, wherein the polycondensation feed comprises PET having an average chain length in the range of from about 5 to about 50; (b) subjecting the reaction medium to polycondensation in the reactor, wherein the reactor comprises a substantially straight pipe, a flow divider disposed in the pipe, a first tray disposed in the pipe, and a second tray disposed in the pipe, wherein the pipe is oriented at a downward angle in the range of from about 10 to about 60 degrees below horizontal, wherein the pipe has a length-to-diameter (L:D) ratio in the range of from about 2:1 to about 50:1, wherein the first and second trays each have a length of at least about 0.25 L, wherein the flow divider divides the reaction medium into a first portion that flows on the bottom of the pipe, a second portion that flows on the first tray, and a third portion that flows on the second tray, wherein the mass flow rates of the first, second, and third portions are within about 50 percent of one another, wherein the first and second trays present respective first and second upwardly facing surfaces across which the second and third portions of the reaction medium flow respectively, wherein the first and second upwardly facing surfaces are each oriented within about 5 degrees of the downward angle of the pipe; and (c) recovering a predominately liquid polycondensation product from the reactor, wherein the polycondensation product comprises PET having an average chain length that is at least about 10 greater than the average chain length of the PET in the polycondensation feed.

In a further embodiment of the present invention, there is provided a reactor comprising a downwardly sloped tubular member, a flow divider disposed in the tubular member, and a tray disposed in the tubular member. The tubular member is elongated along a central axis of elongation that is oriented at a downward angle in the range of from about 5 to about 75 degrees below horizontal. The tray extends at least one-quarter of the length of the tubular member and is spaced from the top and bottom of the tubular member. The reactor defines a lower chamber located generally below the tray and an upper chamber located generally above the tray. The flow divider at least partly defines a first outlet in fluid communication with the lower chamber and a second outlet in fluid communication with the upper chamber.

BRIEF DESCRIPTION OF THE DRAWINGS

Certain embodiments of the present invention are described in detail below with reference to the enclosed figures, wherein.

DETAILED DESCRIPTION

FIGS. 1-7 illustrate various embodiments of exemplary sloped tubular reactors configured in accordance with the present invention. The configuration and operation of the reactors depicted in FIGS. 1-7 are described in detail below. Although certain portions of the following description relate primarily to reactors employed in a melt-phase polyester production process, reactors configured in accordance with embodiments of the present invention may find application in a wide variety of chemical processes. For example, reactors configured in accordance with certain embodiments of the present invention may be advantageously employed in any process where chemical reactions take place in the liquid phase of a reaction medium and a vapor is produced in the reactor. Further, reactors configured in accordance with certain embodiments of the present invention may be advantageously employed in chemical processes that are enhanced by increasing the surface area of the reaction medium.

Figure 1:
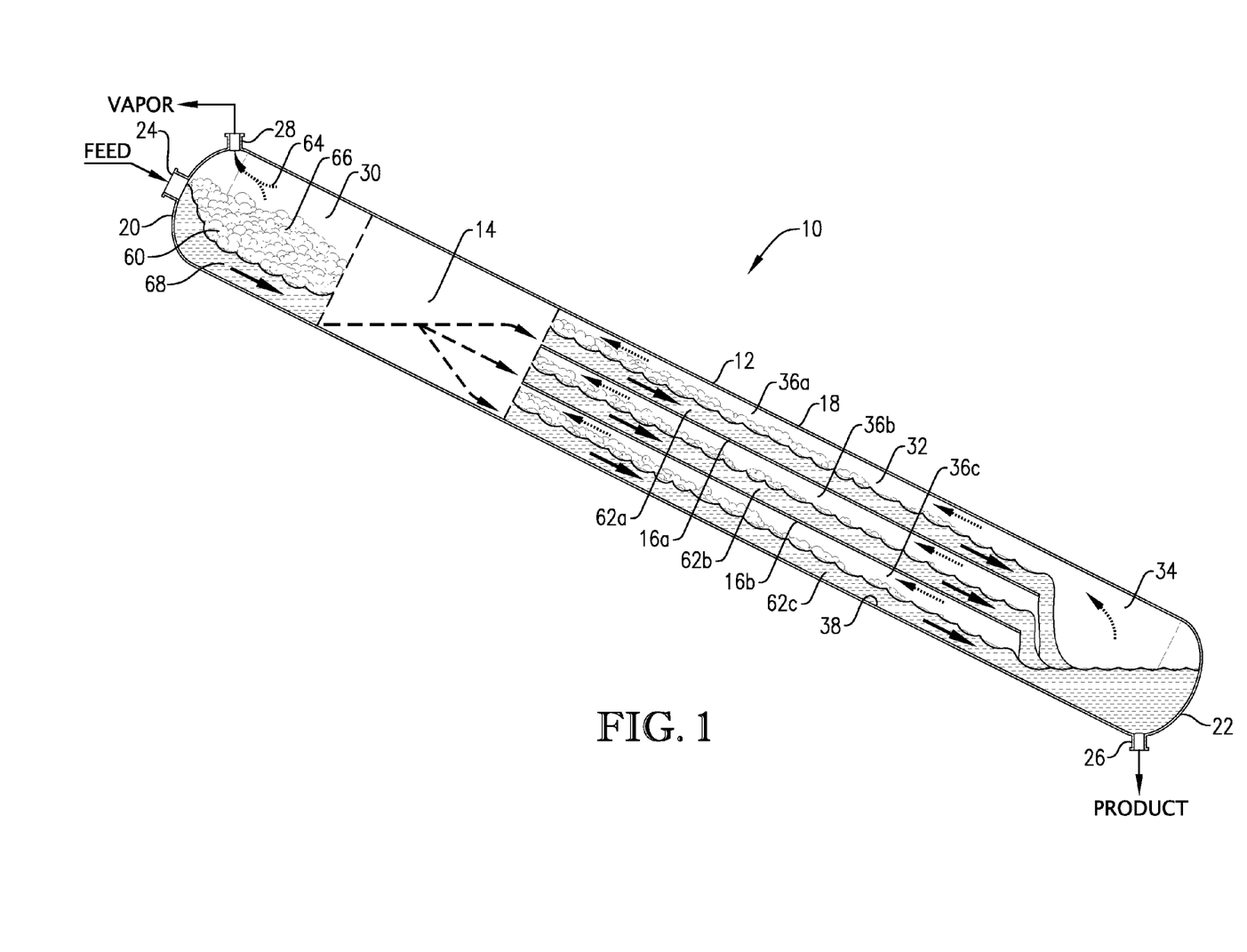
FIG. 1 is a schematic sectional side view of a sloped tubular reactor configured in accordance with one embodiment of the present invention, particularly illustrating that a flow divider is used to distribute a downward flowing reaction medium among an upper internal tray, a lower internal tray, and the bottom of the reactor.

Referring now to FIG. 1, one embodiment of a sloped tubular reactor 10 is illustrated as generally comprising a vessel shell 12, a flow divider 14 disposed in vessel shell 12, and a plurality of trays 16a,b disposed in vessel shell 12. Vessel shell comprises a downwardly sloped tubular member 18, an upper end cap 20 coupled to the upper end of tubular member 18, and a lower end cap 22 coupled to the lower end of tubular member 18. Vessel shell 12 defines a feed inlet 24 located near the top of reactor 10, a liquid product outlet 26 located near the bottom of reactor 10, and a vapor outlet 28 located near the top of reactor 10 (as shown in FIG. 1) or near the bottom of reactor 10 (not shown). In one embodiment, vapor outlet 28 can be connected to a vacuum source (not shown).

The internal volume of reactor 10 includes an upper undivided zone 30 located above flow divider 14, a divided zone 32 located immediately below flow divider 14, and a lower undivided zone 34 located immediately below divided zone 32 near the bottom of reactor 10. Trays 16a,b separate divided zone 32 into an upper chamber 36a, an intermediate chamber 36b, and a lower chamber 36c. Upper chamber 36a is defined generally between the top of tubular member 18 and the upper surface of upper tray 16a. Intermediate chamber 36b is defined generally between the bottom of upper tray 16a and the upper surface of lower tray 16b. Lower chamber 36c is defined generally between the bottom of lower tray 16b and the bottom 38 of tubular member 18. Flow divider 14, which will be described in greater detail below, provides fluid communication between upper undivided zone 30 and chambers 36a,b,c of divided zone 32.

Tubular member 18 of reactor 10 is elongated along a central axis of elongation that is sloped at a downward angle. In certain embodiments of the present invention, the downward angle of tubular member 18 is in the range of from about 5 to about 75 degrees below horizontal, about 10 to about 60 degrees below horizontal, or 15 to 45 degrees below horizontal. In the embodiment illustrated in FIG. 1, tubular member 18 is a substantially straight, substantially cylindrical, elongated pipe. However, in certain embodiments, tubular member 18 can be an elongated tubular member having a variety of cross-sectional configurations (e.g., rectangular, square, or oval).

Vessel shell 12 and/or tubular member 18 can have a maximum length (L) that is greater than its maximum diameter (D). In certain embodiments, shell 12 and/or tubular member 18 has a length-to-diameter (L:D) ratio in the range of from about 2:1 to about 50:1, about 4:1 to about 30:1, or 8:1 to 20:1. In certain embodiments, L is in the range of from about 10 to about 200 feet, about 20 to about 150 feet, or 30 to 80 feet, and D is in the range of from about 1 to about 20 feet, about 2 to about 10 feet, or 3 to 5 feet. Each tray 16a,b can have a length of at least about 0.25 L, at least about 0.5 L, or at least 0.75 L. Further, trays 16a,b can be spaced from one another by a minimum distance in the range of from about 0.1 D to about 0.8 D, about 0.2 D to about 0.6 D, or 0.25 D to 0.5 D. The minimum distance between trays 16a,b can be in the range of from about 5 to about 50 inches, about 10 to about 40 inches, or 15 to 30 inches.

Internal trays 16a,b each present an upwardly facing surface across which a liquid can flow. In the embodiment illustrated in FIG. 1, the upwardly facing surfaces of trays 16a,b are substantially planar and extend substantially parallel to the axis of elongation of tubular member 18. Alternatively, the upwardly facing surfaces of trays 16a,b can extend within about 10 degrees, within about 5 degrees, or within 2 degrees of the downward angle of the axis of elongation of tubular member 18. In one embodiment of the present invention trays 16a,b are substantially rectangular planar plates having parallel edges that are sealingly coupled to the inside of tubular member 18.

In the embodiment illustrated in FIG. 1, reactor 10 comprises two trays 16a,b. However, it should be noted that the number and configuration of trays in reactor 10 can be varied to match the application for which reactor 10 is employed. For example, reactor 10 could employ at least 3 trays, at least 4 trays, at least 5 trays, or at least 6 trays.

Figures 6, 7:
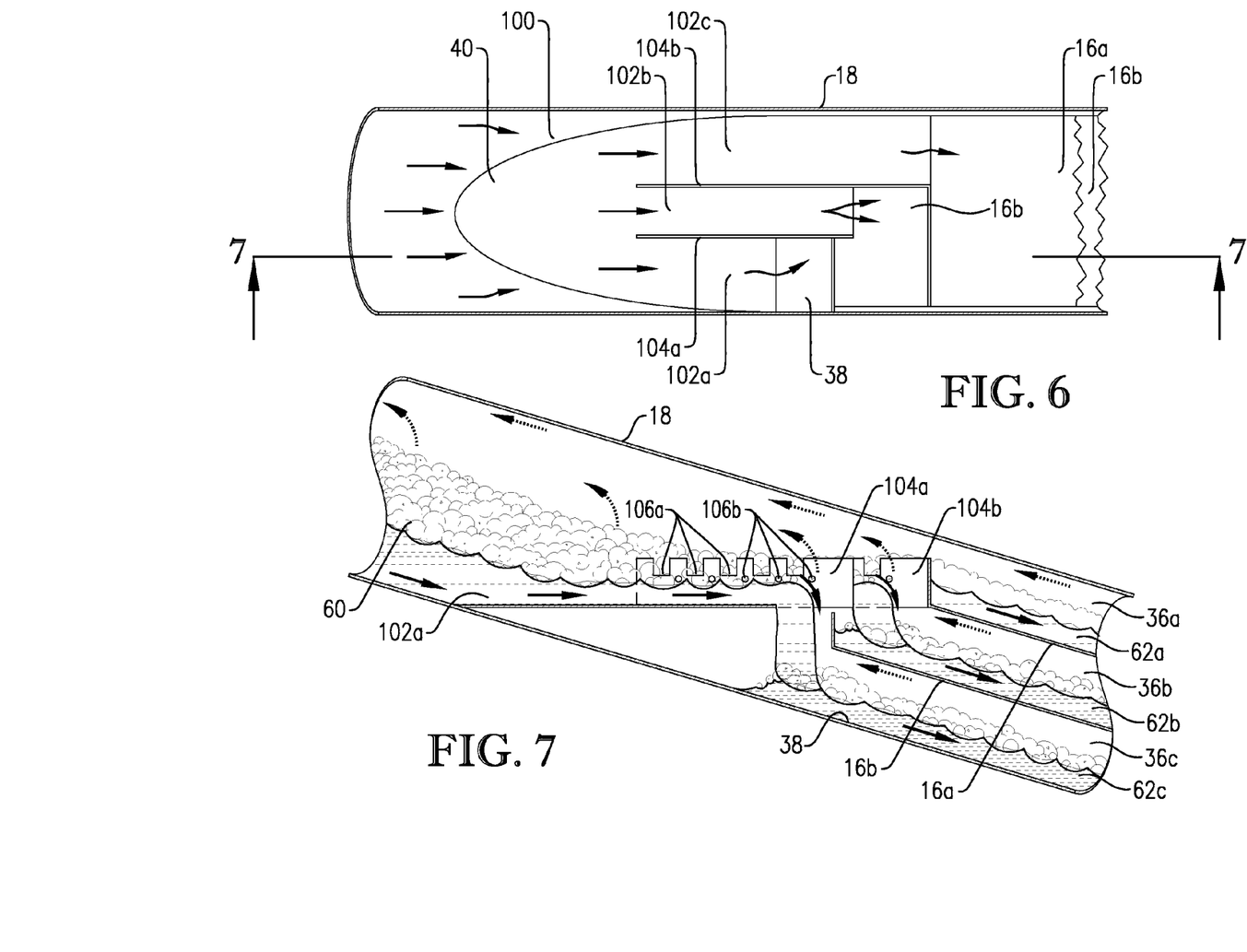
FIG. 6 is a top view of an alternative flow divider suitable for use in the tubular reactor of FIG. 1, particularly illustrating the three flow channels of the flow divider that direct flow of the reaction medium to the internal trays and to the bottom of the reactor.
FIG. 7 is a sectional side view of the flow divider of FIG. 6 taken along line 7-7 in FIG. 6, particularly illustrating flow of the reaction medium through one of the channels of the flow divider and onto the bottom of the reactor.

FIG. 1 does not provide the details of construction of flow divider 14. However, FIG. 1 does indicated with dashed lines and arrows that flow divider 14 is operable to divide fluid flow from upper undivided zone 30 into three portions, and then distribute those portions into upper, intermediate, and lower chambers 36a,b,c of divided zone 32. FIGS. 2-5 illustrate one configuration of a flow divider 14 suitable for use in reactor 10. FIGS. 6 and 7 illustration an alternative configuration of a flow divider 100 suitable for use in reactor 10.

Turning now to FIGS. 2-5, flow divider 14 is illustrated as generally comprising a base member 40, a plurality of spaced apart divider walls 42a-d, a lower backflow prevention wall 44, and a plurality of upper backflow prevention walls 46a-c. Divider walls 42a-d are sealingly coupled to and extend generally upwardly from the upper surface of base member 40. A first bottom channel 47a is defined above base member 40 and generally between a first sidewall 48a of tubular member 18 and first divider wall 42a. A first upper channel 50a is defined above base member 40 and generally between first divider wall 42a and second divider wall 42b. An intermediate channel 52 is defined above base member 40 and generally between second divider wall 42b and third divider wall 42c. A second upper channel 50b is defined above base member 40 and generally between third divider wall 42c and fourth divider wall 42d. A second bottom channel 47b is defined above base member 40 and generally between fourth divider wall 42d and a second sidewall 48b of tubular member 18.

Figure 2:
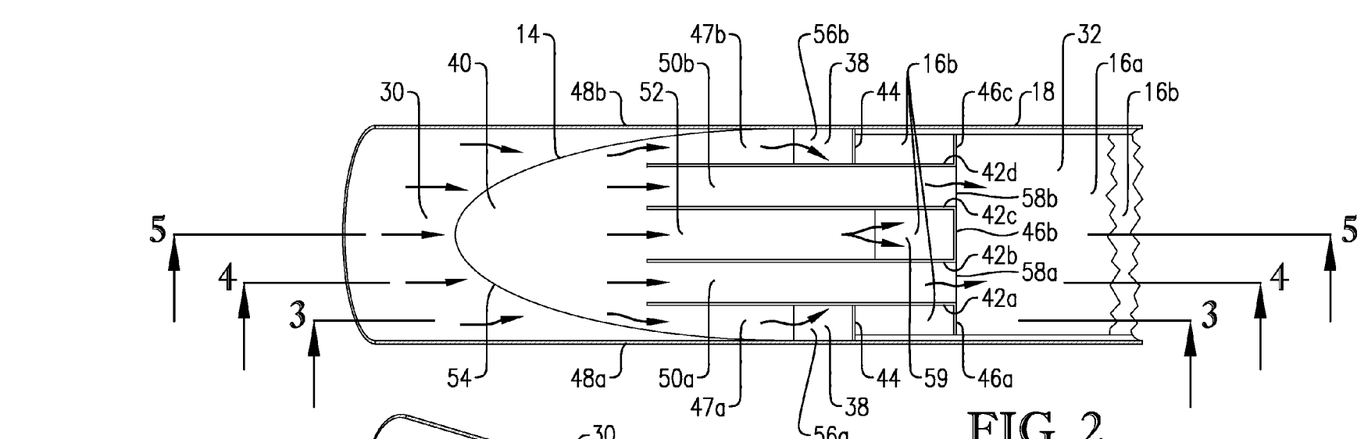
FIG. 2 is a top view of a flow divider suitable for use in the tubular reactor of FIG. 1, particularly illustrating the five flow channels of the flow divider that direct flow of the reaction medium to the internal trays and to the bottom of the reactor.
Figure 3:
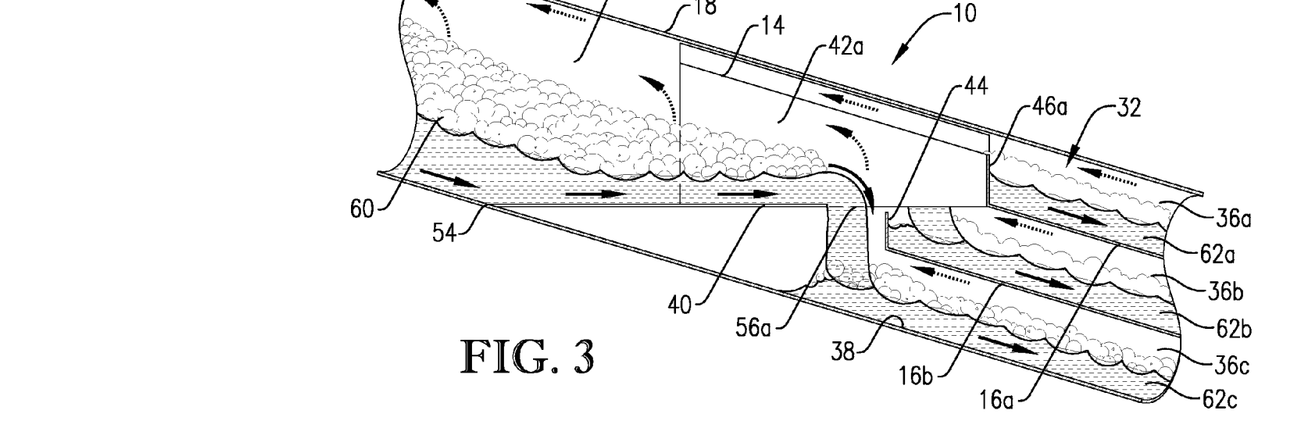
FIG. 3 is a sectional side view of the flow divider of FIG. 2 taken along line 3-3 in FIG. 2, particularly illustrating flow of the reaction medium through one of the channels of the flow divider and onto the bottom of the reactor.

As perhaps best illustrated in FIGS. 2 and 3, bottom channels 47a,b provide fluid communication between upper undivided zone 30 and lower chamber 36c of divided zone 32. Bottom channels 47a,b are in fluid communication with upper undivided zone 30 via respective bottom channel inlet openings located at a leading edge 54 of base member 40.

Bottom channels 47a,b are in fluid communication with lower chamber 36c via bottom channel outlets 56a,b.

Figures 4, 5:
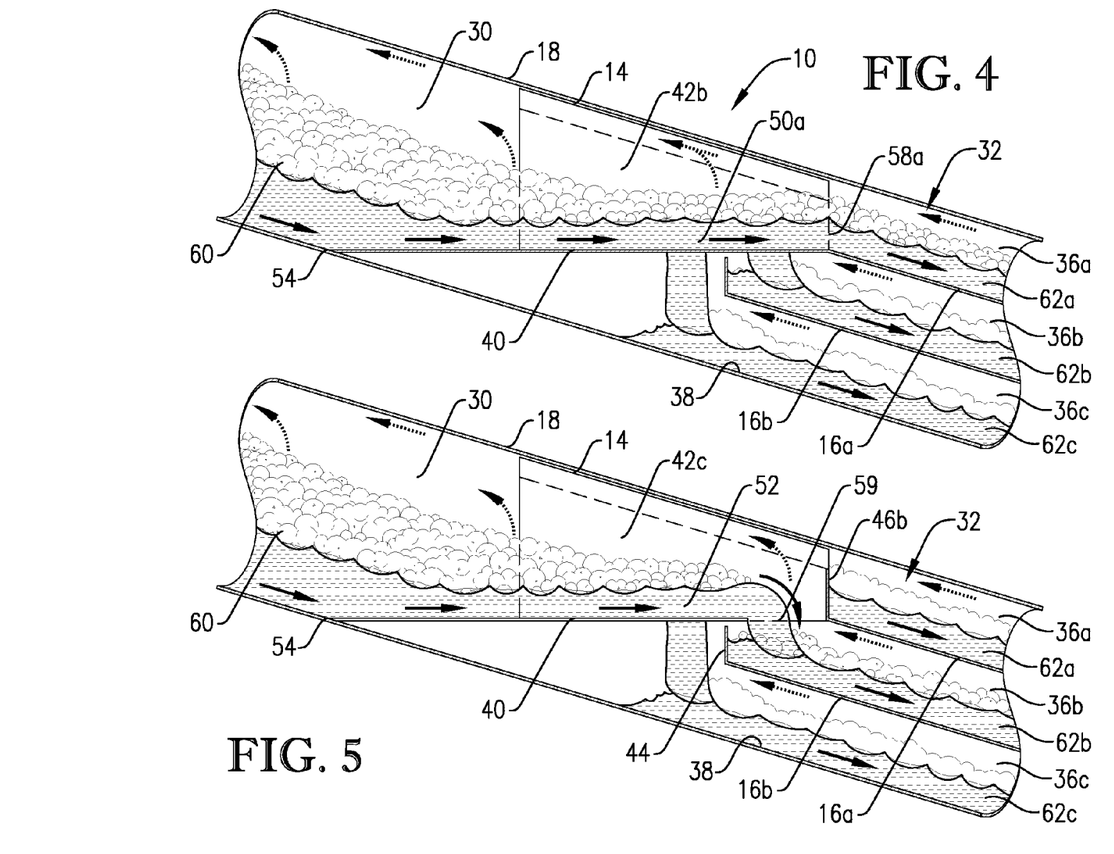
FIG. 4 is a sectional side view of the flow divider of FIG. 2 taken along line 4-4 in FIG. 2, particularly illustrating flow of the reaction medium through one of the channels of the flow divider and onto the upper tray.
FIG. 5 is a sectional side view of the flow divider of FIG. 2 taken along line 5-5 in FIG. 2, particularly illustrating flow of the reaction medium through one of the channels of the flow divider and onto the lower tray.

As perhaps best illustrated in FIGS. 2 and 4, upper channels 50a,b provide fluid communication between upper undivided zone 30 and upper chamber 36a of divided zone 32. Upper channels 50a,b are in fluid communication with upper undivided zone 30 via respective upper channel inlet openings located at leading edge 54 of base member 40. Upper channels 50a,b are in fluid communication with upper chamber 36a via upper channel outlets 58a,b.

As perhaps best illustrated in FIGS. 2 and 5, intermediate channel 52 provides fluid communication between upper undivided zone 30 and intermediate chamber 36b of divided zone 32. Intermediate channel 52 is in fluid communication with upper undivided zone 30 via an intermediate channel inlet opening located at leading edge 54 of base member 40. Intermediate channel 52 is in fluid communication with intermediate chamber 36b via intermediate channel outlet 59.

In the embodiment illustrated in FIGS. 2-5, base member 40 of flow divider 14 is formed of a substantially planar, substantially horizontal plate that is rigidly and sealingly coupled to the inside of tubular member 18 at leading edge 54. In certain embodiments of the present invention, the upper surface of base member 40 extends at an angle within about 15 degrees, within about 5 degrees, or within 2 degrees of horizontal. The difference between the orientation of base member 40 (i.e., substantially horizontal) and tubular member 18 (i.e., downwardly sloping) gives leading edge 54 of flow divider 14 the shape of a partial oval. The angular difference between the orientation of base member 40 and tubular member 18 can be in the range of from about 5 to about 75 degrees, about 10 to about 60 degrees, or 15 to 45 degrees. The number of channels defined by flow divider 14 may vary depending on a number of factors. For example, flow divider 14 can define 2, 3, 4, 5, 6, 7, 8, or more channels.

The operation of reactor 10 will now be described in detail. As shown in FIG. 1, a liquid-containing feed is introduced into reactor 10 via feed inlet 24. In reactor 10, the feed forms a reaction medium 60 that flows initially through upper undivided zone 30 on the bottom of tubular member 18. Reaction medium 60 then flows through flow divider 14 where flow of reaction medium 60 is split into a first portion 62a, a second portion 62b, and a third portion 62c, which are then distributed onto upper tray 16a, lower tray 16b, and bottom 38 of tubular member 18, respectively. First, second, and third portions 62a-c of reaction medium 60 flow by gravity through upper, intermediate, and lower chambers 36a-c of divided zone 32. The mass flow rates of first, second, and third portions 62a-c of reaction medium 60 can be within about 50 percent, within about 30 percent, or within 10 percent of one another. For example, the mass flow rates of the three portions of reaction medium 60 are within 50 percent of one another when the mass flow rate of the portion with the lowest mass flow rate is not less than 50 percent of the mass flow rate of the portion with the highest mass flow rate. After flowing across trays 16a,b, first and second portions 62a,b of reaction medium 60 fall downwardly off of the terminal ends of trays 16a,b and are recombined with third portion 62c of reaction medium 60 in lower undivided zone 34. The combined reaction medium 60 in lower undivided zone 34 then exits reactor 10 as a predominately liquid product via liquid product outlet 26.

As reaction medium 60 flows through reactor 10, a chemical reaction takes place within reaction medium 60. A vapor 64 can be formed in reactor 10. Vapor 64 can include a vapor byproduct of the chemical reaction carried out in reactor 10 and/or volatile compounds that enter reactor 10 as liquids and are vaporized in reactor 10. At least a portion of the vapor 64 is disengaged from and flows generally over reaction medium 60 countercurrent to the direction of flow of reaction medium 60. Vapor 64 exits reactor 10 via vapor outlet 28. Alternatively, vapor 64 can flow co-currently with reaction medium 60 and exit a vapor outlet (not shown) located near the lower end of reactor 10.

As depicted in FIG. 1, in one embodiment of the present invention, the chemical reaction carried out in reactor 10 causes foaming of reaction medium 60, thereby producing a foam portion 66 and a predominately liquid portion 68 of reaction medium 60. The chemical reaction can take place in the liquid of both foam portion 66 and predominately liquid portion 68.

Turning now the FIGS. 2-5, the manner in which reaction medium 60 is split in flow divider 14 will now be discussed in greater detail. Reaction medium 60 enters flow divider 14 from upper undivided zone 30 by flowing from the bottom of tubular member 18, across leading edge 54 of base member 40, and into channels 47a, 50a, 52, 50b, and 47b. In flow divider 14, reaction medium 60 is split into five portions that are separated by divider walls 42a-d and flow through channels 47a, 50a, 52, 50b, and 47b.

As perhaps best illustrated in FIGS. 2 and 3, the portions of reaction medium 60 flowing through bottom channels 47a,b exit bottom channels 47a,b via bottom channel outlets 56a,b and enter lower chamber 36c of divided zone 32. The portions of reaction medium 60 exiting bottom channels 47a,b and entering lower chamber 36c combine on bottom 38 of tubular member 18 to form third portion 62c of reaction medium 60. As depicted in FIG. 3, vapor produced in lower chamber 36c flows generally countercurrent to third portion 62c of reaction medium 60 in lower chamber 36c. Vapor from lower chamber 36c flows upwardly through bottom channel outlets 56a,b, through bottom channels 47a,b, and into upper undivided zone 30, where it is combined with vapors exiting channels 50a,b and 52.

As perhaps best illustrated in FIGS. 2 and 4, the portions of reaction medium 60 flowing through upper channels 50a,b exit upper channels 50a,b via upper channel outlets 58a,b and enter upper chamber 36a of divided zone 32. The portions of reaction medium 60 exiting upper channels 50a,b and entering upper chamber 36a combine on upper tray 16a to form first portion 62a of reaction medium 60. As shown in FIGS. 2, 3, and 5 upper backflow prevention walls 46a-c are provided near the top of upper tray 16a to keep first portion 62a of reaction medium 60 from flowing over the top of upper tray 16a and down onto lower tray 16b. Referring again to FIG. 4, vapor produced in upper chamber 36a flows generally countercurrent to first portion 62a of reaction medium 60 in upper chamber 36a. Vapor from upper chamber 36a flows upwardly through upper channel outlets 58a,b, through upper channels 50a,b, and into upper undivided zone 30 where it is combined with vapors exiting channels 47a,b and 52.

As perhaps best illustrated in FIGS. 2 and 5, the portion of reaction medium 60 flowing through intermediate channel 52 exits intermediate channel 52 via intermediate channel outlet 59 and enters intermediate chamber 36b of divided zone 32. The portion of reaction medium 60 exiting intermediate channel 52 and entering intermediate chamber 36b forms second portion 62b of reaction medium 60 on lower tray 16b. As shown in FIGS. 2 and 3, lower backflow prevention wall 44 is provided near the top of lower tray 16b to keep second portion 62b of reaction medium 60 from flowing over the top of lower tray 16b and down onto bottom 38 of tubular member 18. As depicted in FIG. 5, vapor produced in intermediate chamber 36b flows generally countercurrent to second portion 62b of reaction medium 60 in intermediate chamber 36b. Vapor from intermediate chamber 36b flows upwardly through intermediate channel opening 59, through intermediate channel 52, and into upper undivided zone 30 where it is combined with vapors exiting channels 47a,b and 50a,b.

Referring now to FIGS. 6 and 7, there is illustrated an alternative flow divider 100 suitable for use in reactor 10 of FIG. 1. Alternative flow divider 100 is similar to flow divider 14 of FIGS. 2-5; however, alternative flow divider 100 only defines three channels 102a-c, whereas flow divider 14 of FIGS. 2-5 defines five flow channels. Another difference between alternative flow divider 100 of FIGS. 6 and 7 and flow divider 14 of FIGS. 2-5 is that alternative flow divider 100 is illustrated as having divider walls 104a,b that are configured with flow equalizing openings 106a,b. It should be understood that divider walls 42a-d of flow divider 14 of FIGS. 2-5 can also be equipped with flow equalizing openings.

Referring again to FIGS. 6 and 7, in operation, alternative flow divider 100 receives reaction medium 60 and divides reaction medium 60 into three portions that flow through bottom channel 102a, intermediate channel 102b, and upper channel 102c. As reaction medium 60 flows through channels 102a-c, the depth of reaction medium 60 in channels 102a-c can be substantially equalized by permitting reaction medium 60 to flow between channels 102a-c via flow equalizing openings 106a,b. The portion of reaction medium 60 in bottom channel 102a flows out of bottom channel 102a and enters lower chamber 36c for flow on bottom 38 of tubular member 18. The portion of reaction medium 60 in intermediate channel 102b flows out of intermediate channel 102b and enters intermediate chamber 36b for flow on lower tray 16b. The portion of reaction medium 60 in upper channel 102c flows out of upper channel 102c and enters upper chamber 36a for flow on upper tray 16a.

Sloped tubular reactors configured in accordance with certain embodiments of the present invention require little or no mechanical agitation of the reaction medium processed therein. Although the reaction medium processed in the sloped tubular reactor may be somewhat agitated by virtue of flowing through the reactor and falling from one reactor level to another, this flow agitation and gravitational agitation is not mechanical agitation. In one embodiment of the present invention, less than about 50 percent, less than about 25 percent, less than about 10 percent, less than about 5 percent, or 0 percent of the total agitation of the reaction medium processed in the sloped tubular reactor is provided by mechanical agitation. Thus, reactors configured in accordance with certain embodiments of the present invention can operate without any mechanical mixing devices. This is in direct contrast to conventional continuous stirred tank reactors (CSTRs) which employ mechanical agitation almost exclusively.

As indicated above, sloped tubular reactors configured in accordance with embodiments of the present invention reactors can be used in a variety of chemical processes. In one embodiment, a sloped tubular reactor configured in accordance with the present invention is employed in a melt-phase polyester production facility capable of producing any of a variety of polyesters from a variety of starting materials. Examples of melt-phase polyesters that can be produced in accordance with embodiments of the present invention include, but are not limited to, polyethylene terephthalate (PET), which includes homopolymers and copolymers of PET; fully aromatic or liquid crystalline polyesters; biodegradable polyesters, such as those comprising butanediol, terephthalic acid and adipic acid residues; poly(cyclohexane-dimethylene terephthalate) homopolymer and copolymers; and homopolymers and copolymers of 1,4-cyclohexane-dimethanol (CHDM) and cyclohexane dicarboxylic acid or dimethyl cyclohexanedicarboxylate. When a PET copolymer is produced, such copolymer can comprise at least 90, at least 91, at least 92, at least 93, at least 94, at least 95, at least 96, at least 97, at least 98 mole percent of ethylene terephthalate repeat units and up to 10, up to 9, up to 8, up to 7, up to 6, up to 5, up to 4, up to 3, or up to 2 mole percent of added comonomer repeat units. Generally, the comonomer repeat units can be derived from one or more comonomers selected from the group consisting of isophthalic acid, 2,6-naphthaline-dicarboxylic acid, CHDM, and diethylene glycol.

In general, a polyester production process according to certain embodiments of the present invention can comprise two main stages—an esterification stage and a polycondensation stage. In the esterification stage, the polyester starting materials, which can comprise at least one alcohol and at least one acid, are subjected to esterification to thereby produce polyester monomers and/or oligomers. In the polycondensation stage, the polyester monomers and/or oligomers from the esterification stage are reacted into the final polyester product. As used herein with respect to PET, monomers have less than 3 chain lengths, oligomers have from about 7 to about 50 chain lengths (components with a chain length of 4 to 6 units can be considered monomer or oligomer), and polymers have greater than about 50 chain lengths. A dimer, for example, EG-TA-EG-TA-EG, has a chain length of 2, and a trimer 3, and so on.

The acid starting material employed in the esterification stage can be a dicarboxylic acid such that the final polyester product comprises at least one dicarboxylic acid residue having in the range of from about 4 to about 15 or from 8 to 12 carbon atoms. Examples of dicarboxylic acids suitable for use in the present invention can include, but are not limited to, terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, and mixtures thereof. In one embodiment, the acid starting material can be a corresponding ester, such as dimethyl terephthalate instead of terephthalic acid.

The alcohol starting material employed in the esterification stage can be a diol such that the final polyester product can comprise at least one diol residue, such as, for example, those originating from cycloaliphatic diols having in the range of from about 3 to about 25 carbon atoms or 6 to 20 carbon atoms. Suitable diols can include, but are not limited to, ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4tetramethyl-cyclobutanediol, 2,2-bis-(3-hydroxyethoxyphenyl)-propane, 2,2-bis-(4-hydroxy-propoxyphenyl)-propane, isosorbide, hydroquinone, BDS-(2,2-(sulfonylbis)4,1-phenyleneoxy))bis(ethanol), and mixtures thereof.

In addition, the starting materials can comprise one or more comonomers. Suitable comonomers can include, for example, comonomers comprising terephthalic acid, dimethyl terephthalate, isophthalic acid, dimethyl isophthalate, dimethyl-2,6-naphthalenedicarboxylate, 2,6-naphthalene-dicarboxylic acid, ethylene glycol, diethylene glycol, 1,4-cyclohexane-dimethanol (CHDM), 1,4-butanediol, polytetramethyleneglyocl, trans-DMCD, trimellitic anhydride, dimethyl cyclohexane-1,4 dicarboxylate, dimethyl decalin-2,6 dicarboxylate, decalin dimethanol, decahydronaphthalane 2,6-dicarboxylate, 2,6-dihydroxymethyl-decahydronaphthalene, hydroquinone, hydroxybenzoic acid, and mixtures thereof.

According to one embodiment of the present invention, the esterification in the esterification stage can be carried out at a reaction medium temperature in the range of from about 180 to about 350° C., or about 215 to about 305° C., or 260 to 290° C. and a vapor space pressure of less than about 70 psig, in the range of from about −1 to about 10 psig, or 2 to 5 psig. The average chain length of the monomer and/or oligomer exiting the esterification stage can be in the range of from about 1 to about 20, from about 2 to about 15, or from 5 to 12.

Reactors configured in accordance with certain embodiments of the present invention can be employed in a melt-phase polyester production system as a prepolymer reactor for carrying out a prepolymerization step and/or as a finisher reactor for carrying out a finishing step. A detailed description of the process conditions for the present invention employed as a prepolymer reactor and/or a finisher reactor is given below with reference to FIG. 1. It is understood that reactors configured in accordance with embodiments of the present invention can generally be employed as prepolymer reactors and/or finisher reactors and that these process conditions are not limited to the embodiment described in FIG. 1.

Referring again to FIG. 1, when reactor 10 is employed as a prepolymer reactor in a melt-phase polyester production process (e.g., a process for making PET), more than one chemical reaction can be carried out in reactor 10. For example, although polycondensation may be the predominate chemical reaction carried out in reactor 10, a certain amount of esterification may also occur in reactor 10. When reactor 10 is employed as a prepolymer reactor, the average chain length of the feed introduced into feed inlet 24 can be in the range of from about 1 to about 20, about 2 to about 15, or 5 to 12, while the average chain length of the predominately liquid product withdrawn from liquid product outlet 26 can be in the range of from about 5 to about 50, about 8 to about 40, or 10 to 30. When reactor 10 is employed as a prepolymerization reactor, the chemical reaction carried out in reactor 10 can cause the average chain length of reaction medium 60 to increase by at least about 2, in the range of from about 5 to about 30, or in the range of 8 to 20 between feed inlet 22 and liquid product outlet 26.

When reactor 10 is employed as a prepolymer reactor, the feed can enter feed inlet 24 at a temperature in the range of from about 220 to about 350° C., about 265 to about 305° C., or 270 to 290° C. The predominately liquid product exiting liquid product outlet 26 can have a temperature within about 50° C., 25° C., or 10° C. of the temperature of the feed entering feed inlet 24. In one embodiment, the temperature of the liquid product exiting liquid product outlet 26 is in the range of from about 220 to about 350° C., about 265 to about 305° C., or 270 to 290° C. When reactor 10 is employed as a prepolymer reactor, the vapor space pressure in reactor 10 (measured at vapor outlet 28) can be maintained in the range of from about 0 to about 300 torr, in the range of from about 1 to about 50 torr, or in the range of from 20 to 30 torr.

When reactor 10 is employed as a prepolymer reactor, it may be desirable to heat the feed prior to introduction into reactor 10 and/or it may be desirable to heat reaction medium 60 as it flows through reactor 10. Generally, the cumulative amount of heat added to the feed immediately upstream of reactor 10 plus the heat added to reaction medium 60 in reactor 10 can be in the range of from about 100 to about 5,000 BTU/lb, in the range of from about 400 to about 2,000 BTU/lb, in the range of from 600 to 1,500 BTU/lb.

Referring again to FIG. 1, when reactor 10 is employed as a finisher reactor in a melt-phase polyester production process (e.g., a process for making PET), the average chain length of the feed introduced into feed inlet 24 can be in the range of from about 5 to about 50, about 8 to about 40, or 10 to 30, while the average chain length of the predominately liquid product withdrawn from liquid product outlet 26 can be in the range of from about 30 to about 210, about 40 to about 80, or 50 to 70. Generally, the polycondensation carried out in reactor 10 can cause the average chain length of reaction medium 60 to increase by at least about 10, at least about 25, or at least 50 between feed inlet 24 and liquid product outlet 26.

When reactor 10 is employed as a finisher reactor, the feed can enter feed inlet 24 at a temperature in the range of from about 220 to about 350° C., about 265 to about 305° C., or 270 to 290° C. The predominately liquid product exiting liquid product outlet 26 can have a temperature within about 50° C., 25° C., or 10° C. of the temperature of the feed entering feed inlet 24. In one embodiment, the temperature of the liquid product exiting liquid product outlet 26 is in the range of from about 220 to about 350° C., about 265 to about 305° C., or 270 to 290° C. When reactor 10 is employed as a finisher reactor, the vapor space pressure in reactor 10 (measured at vapor outlet 28) can be maintained in the range of from about 0 to about 30 torr, in the range of from about 1 to about 20 torr, or in the range of from 2 to 10 torr.

Reactors configured in accordance with embodiments of the present invention can provide numerous advantages when employed as reactors in the polycondensation stages of a polyester production process. Such reactors can be particularly advantageous when employed as prepolymer and/or finisher reactors in a process for making PET. Further, such reactors are well suited for use in commercial scale PET production facilities capable of producing PET at a rate of at least about 10,000 pounds per hours, at least about 100,000 pounds per hour, at least about 250,000 pounds per hour, or at least 500,000 pounds per hour.

In one embodiment of the present invention, there is provided a process comprising subjecting a reaction medium to a chemical reaction in a reactor comprising a downwardly sloped tubular member, a flow divider disposed in the tubular member, and a first tray disposed in the tubular member. The tubular member is elongated along a central axis of elongation that is oriented at a downward angle in the range of from about 5 to about 75 degrees below horizontal. The flow divider divides the reaction medium into a first portion that flows on the bottom of the tubular member and a second portion that flows on the first tray. The detailed descriptions of FIGS. 1-7, including features of the tubular member, reaction medium flow, flow divider, and trays, apply to this embodiment.

In one example, a product is removed from a product outlet of the reactor, wherein the reaction medium forms the product in the reactor. Additionally, when the chemical reaction comprises polycondensation, the product can be a polycondensation product. The It.V. of the product or polycondensation product can be in the range of from about 0.3 to about 1.2, about 0.35 to about 0.6, or 0.4 to 0.5 dL/g. In one example, It.V. of the product or polycondensation product is in the range of from about 0.1 to about 0.5, about 0.1 to about 0.4, or 0.15 to 0.35 dL/g. In one example, a feed is introduced to a feed inlet of the reactor to form the reaction medium and the It.V. of the feed is in the range of from about 0.1 to about 0.5, about 0.1 to about 0.4, or 0.15 to 0.35 dL/g.

The Intrinsic viscosity (It.V.) values are set forth in dL/g units as calculated from the inherent viscosity measured at 25° C. in 60% phenol and 40% 1,1,2,2-tetrachloroethane by weight. Polymer samples can be dissolved in the solvent at a concentration of 0.25 g/50 mL. The viscosity of the polymer solutions can be determined, for example, using a Rheotek Glass Capillary viscometer. A description of the operating principle of this viscometer can be found in ASTM D 4603. The inherent viscosity is calculated from the measured solution viscosity. The following equations describe such solution viscosity measurements and subsequent calculations to Ih.V. and from Ih.V. to It.V:

$$\eta_{inh}=[\ln(t_s/t_o)]/C$$

where $\eta_{inh}$=Inherent viscosity at 25° C. at a polymer concentration of 0.5 g/100 mL of 60% phenol and 40% 1,1,2,2-tetrachloroethane by weight
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C\to 0}(\eta_{sp}/C) = \lim_{C\to 0}(\ln\eta_r)/C$$

where $\eta_{int}$=Intrinsic viscosity
$\eta_r$=Relative viscosity=$t_s/t_o$
$\eta_{sp}$=Specific viscosity=$\eta_r-1$ The intrinsic viscosity (It.V. or $\eta_{int}$) may be estimated using the Billmeyer equation as follows:

$$\eta_{int}=0.5[e^{0.5\times Ih.V.}-1]+(0.75\times Ih.V.)$$

The reference for estimating intrinsic viscosity (Billmeyer relationship) is *J. Polymer Sci.*, 4, pp. 83-86 (1949).

The viscosity of the polymer solutions can also be determined using a Viscotek Modified Differential Viscometer (a description of the operating principle of the differential pressure viscometers can be found in ASTM D 5225) or other methods known to one skilled in the art.

In another embodiment of the present invention, there is provided a process for making polyethylene terephthalate (PET), the process comprising: (a) introducing a polycondensation feed into a polycondensation reactor, wherein the polycondensation feed forms a reaction medium in the reactor, wherein the polycondensation feed comprises PET having an average chain length in the range of from about 5 to about 50; (b) subjecting the reaction medium to polycondensation in the reactor, wherein the reactor comprises a substantially straight pipe, a flow divider disposed in the pipe, a first tray disposed in the pipe, and a second tray disposed in the pipe, wherein the pipe is oriented at a downward angle in the range of from about 10 to about 60 degrees below horizontal, wherein the pipe has a length-to-diameter (L:D) ratio in the range of from about 2:1 to about 50:1, wherein the first and second trays each have a length of at least about 0.25 L, wherein the flow divider divides the reaction medium into a first portion that flows on the bottom of the pipe, a second portion that flows on the first tray, and a third portion that flows on the second tray, wherein the mass flow rates of the first, second, and third portions are within about 50 percent of one another, wherein the first and second trays present respective first and second upwardly facing surfaces across which the second and third portions of the reaction medium flow respectively, wherein the first and second upwardly facing surfaces are each oriented within about 5 degrees of the downward angle of the pipe; and (c) recovering a predominately liquid polycondensation product from the reactor, wherein the polycondensation product comprises PET having an average chain length that is at least about 10 greater than the average chain length of the PET in the polycondensation feed. The detailed descriptions of FIGS. 1-7, including features of the tubular member, reaction medium flow, flow divider, and trays, apply to this embodiment.

In one example, the It.V. of or polycondensation feed is in the range of from about 0.1 to about 0.5, about 0.1 to about 0.4, or about 0.15 to about 0.35 dL/g. In one example, the It.V. of or polycondensation product is in the range of from about 0.3 to about 1.2, about 0.35 to about 0.6, or 0.4 to 0.5 dL/g.

In a further embodiment of the present invention, there is provided a reactor comprising a downwardly sloped tubular member, a flow divider disposed in the tubular member, and a tray disposed in the tubular member. The tubular member is elongated along a central axis of elongation that is oriented at a downward angle in the range of from about 5 to about 75 degrees below horizontal. The tray extends at least one-quarter of the length of the tubular member and is spaced from the top and bottom of the tubular member. The reactor defines a lower chamber located generally below the tray and an upper chamber located generally above the tray. The flow divider at least partly defines a first outlet in fluid communication with the lower chamber and a second outlet in fluid communication with the upper chamber. The detailed descriptions of FIGS. 1-7, including features of the tubular member, reaction medium flow, flow divider, and trays, apply to this embodiment.

Numerical Ranges

The present description uses numerical ranges to quantify certain parameters relating to the invention. It should be understood that when numerical ranges are provided, such ranges are to be construed as providing literal support for claim limitations that only recite the lower value of the range, as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "a," "an," "the," and "said" means one or more.

As used herein, the term "agitation" refers to work dissipated into a reaction medium causing fluid flow and/or mixing.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "average chain length" means the average number of repeating units in the polymer. For a polyester, average chain length means the number of repeating acid and alcohol units. Average chain length is synonymous with the number average degree of polymerization (DP). The average chain length can be determined by various means known to those skilled in the art. For example, 1H-NMR can be used to directly determine the chain length based upon end group analysis, and light scattering can be used to measure the weight average molecular weight with correlations used to determine the chain length. Chain length is often calculated based upon correlations with gel permeation chromotagraphy (GPC) measurements and/or viscosity measurements.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided below.

As used herein, the term "conversion" is used to describe a property of the liquid phase of a stream that has been subjected to esterification, wherein the conversion of the esterified stream indicates the percentage of the original acid end groups that have been converted (i.e., esterified) to ester groups. Conversion can be quantified as the number of converted end groups (i.e., alcohol end groups) divided by the total number of end groups (i.e., alcohol plus acid end groups), expressed as a percentage.

As used herein, the term "directly coupled" refers to a manner of coupling two vessels in fluid flow communication with one another without the use of an intermediate connector having a substantially narrower diameter than the two vessels.

As used herein, the term "esterification" refers to both esterification and ester exchange reactions.

As used herein, the terms "having," "has," and "have" have the same open-ended meaning as "comprising," "comprises," and "comprise," provided above.

As used herein, the term "horizontally elongated" means that the maximum horizontal dimension is larger than the maximum vertical dimension.

As used herein, the terms "including," "includes," and "include" have the same open-ended meaning as "comprising," "comprises," and "comprise," provided above.

As used herein, the term, "mechanical agitation" refers to agitation of a reaction medium caused by physical movement of a rigid or flexible element(s) against or within the reaction medium.

As used herein, the term "open flow area" refers to the open area available for fluid flow, where the open area is measured along a plane that is perpendicular to the direction of flow through the opening.

As used herein, the term "pipe" refers to a substantially straight elongated tubular member having a generally cylindrical sidewall.

As used herein, the terms "polyethylene terephthalate" and "PET" include PET homopolymers and PET copolymers.

As used herein, the terms "polyethylene terephthalate copolymer" and "PET copolymer" mean PET that has been modified by up to 10 mole percent with one or more added comonomers. For example, the terms "polyethylene terephthalate copolymer" and "PET copolymer" include PET modified with up to 10 mole percent isophthalic acid on a 100 mole percent carboxylic acid basis. In another example, the terms "polyethylene terephthalate copolymer" and "PET copolymer" include PET modified with up to 10 mole percent 1,4-cyclohexane dimethanol (CHDM) on a 100 mole percent diol basis.

As used herein, the term "polyester" refers not only to traditional polyesters, but also includes polyester derivatives, such as, for example, polyetheresters, polyester amides, and polyetherester amides.

As used herein, "predominately liquid" means more than 50 volume percent liquid.

As used herein, the term "reaction medium" refers to any medium subjected to chemical reaction.

As used herein, the term "residue" refers to the moiety that is the resulting product of the chemical species in a particular reaction scheme or subsequent formulation or chemical product, regardless of whether the moiety is actually obtained from the chemical species.

As used herein, the term "vertically elongated" means that the maximum vertical dimension is larger than the maximum horizontal dimension.

As used herein, the term "vapor byproduct" includes the vapor generated by a desired chemical reaction (i.e., a vapor coproduct) and any vapor generated by other reactions (i.e., side reactions) of the reaction medium.

Claims Not Limited to Disclosed Embodiments

The exemplary embodiments of the invention described above are to be used as illustration only, and should not be used in a limiting sense to interpret the scope of the claimed invention. Various modifications to the above-described exemplary embodiments could be readily made by those skilled in the art without departing from the scope of the invention as set forth in the following claims.

What is claimed is:

1. A process comprising: introducing a polycondensation feed into a polycondensation reactor, wherein said polycondensation feed comprises PET and forms a reaction medium in said reactor, subjecting said reaction medium to a polycondensation reaction in said reactor comprising a downwardly sloped tubular member, a flow divider disposed in said tubular member, and a first tray disposed in said tubular member, wherein said tubular member is elongated along a central axis of elongation that is oriented at a downward angle in the range of from about 5 to about 75 degrees below horizontal, wherein said flow divider divides said reaction medium into a first portion that flows on the bottom of said tubular member and a second portion that flows on said first tray.

2. The process of claim 1, wherein said reactor includes an undivided zone and a divided zone, wherein said undivided zone is located at a higher elevation than said divided zone, wherein said undivided zone does not contain said first tray, wherein said divided zone contains said first tray, wherein said flow divider is disposed between said undivided and divided zones.

3. The process of claim 1, wherein said reaction medium flows by gravity through said reactor.

4. The process of claim 1, wherein the mass flow rates of said first and second portions are within about 50 percent of one another.

5. The process of claim 1, wherein said first tray presents an upwardly facing tray surface across which said second portion flows, wherein said upwardly facing tray surface is oriented within about 10 degrees of said downward angle.

6. The process of claim 5, wherein said flow divider presents an upwardly facing divider surface across which said reaction medium flows, wherein said upwardly facing divider surface is oriented within about 15 degrees of horizontal.

7. The process of claim 5, wherein said upwardly facing tray surface is substantially planar and is oriented substantially parallel to said downward angle.

8. The process of claim 5, wherein said downward angle is in the range of from about 10 to about 60 degrees below horizontal.

9. The process of claim 1, wherein said flow divider at least partly defines a first outlet through which said first portion of said reaction medium flows and a second outlet through which said second portion of said reaction medium flows.

10. The process of claim 9, wherein said flow divider at least partly defines a flow channel for directing said second portion of said reaction medium from the bottom of said tubular member to said second outlet.

11. The process of claim 10, wherein said flow divider comprises at least one upright wall defining at least a portion of said flow channel.

12. The process of claim 11, wherein said flow divider comprises a substantially planar substantially horizontal plate sealing coupled to the inside of said tubular member, wherein at least a portion of said reaction medium flows across at least a portion of said plate, wherein said upright wall is sealingly coupled to and extends upwardly from said plate.

13. The process of claim 1, wherein said first tray comprises a substantially planar plate comprising substantially parallel edges, wherein said substantially parallel edges are sealing coupled to the inside of said tubular member.

14. The process of claim 1, wherein said tubular member is a substantially straight pipe.

15. The process of claim 1, wherein said tubular member has a length-to-diameter (L:D) ratio in the range of from about 2:1 to about 50:1.

16. The process of claim 15, wherein said first tray has a length of at least about 0.25 L.

17. The process of claim 15, wherein L is in the range of from about 10 to about 200 feet and D is in the range of from about 1 to about 20 feet.

18. The process of claim 1, wherein said reactor further comprises a second tray disposed in said tubular member and spaced from said first tray, wherein said flow divider divides said reaction medium into said first portion, said second portion, and a third portion that flows on said second tray.

19. The process of claim 18, wherein the mass flow rates of said first, second, and third portions are within about 50 percent of one another.

20. The process of claim 1, wherein a vapor byproduct of said polycondensation reaction flows upwardly in said tubular member as said reaction medium flows downwardly in said tubular member.

21. The process of claim 20, further comprising discharging at least a portion of said vapor byproduct from said reactor via a vapor outlet located near the top and/or bottom of said reactor.

22. The process of claim 1, wherein said polycondensation feed is predominately liquid and said introducing occurs at a feed inlet located near the top of said reactor.

23. The process of claim 1, further comprising combining said first and second portions of said reaction medium near the bottom of said reactor and discharging the combined reaction medium from a liquid outlet located near the bottom of said reactor.

24. The process of claim 1, wherein the average chain length of said PET in said reaction medium increases by at least about 10 in said reactor.

25. The process of claim 24, wherein said PET in said polycondensation feed has an average chain length in the range of from about 5 to about 50.

26. The process of claim 25, wherein said polycondensation feed is maintained at a temperature in the range of from about 220 to about 350° C., wherein the vapor space pressure in said reactor is maintained in the range of from about 0 to about 30 torr.

27. The process of claim 1, wherein said PET is a PET copolymer comprising at least about 90 mole percent ethylene terephthalate repeat units and up to about 10 mole percent of added comonomer repeat units.

28. The process of claim 27, wherein said added comonomer repeat units are derived from an added comonomer selected from the group consisting of isophthalic acid, 2,6-naphthaline-dicarboxylic acid, 1,4-cyclohexane-dimethanol, diethylene glycol, and combinations of two or more thereof.

29. The process of claim 28, wherein said added comonomer comprises isophthalic acid.

30. The process of claim 23, wherein said PET in said combined reaction medium is discharged from said reactor at a rate of at least about 10,000 pounds per hour.

31. The process of claim 1, wherein the average chain length of said PET in said reaction medium increases by at least about 2 in said reactor.

32. The process of claim 31, wherein said PET in said polycondensation feed has an average chain length in the range of from about 1 to about 20.

33. The process of claim 32, wherein said polycondensation feed is maintained at a temperature in the range of from about 220 to about 350° C., wherein the vapor space pressure in said reactor is maintained in the range of from about 0 to about 300 torr.

34. The process of claim 1, wherein said reactor comprises no mechanical mixing device.

35. A process for making polyethylene terephthalate (PET), said process comprising:
  (a) introducing a polycondensation feed into a polycondensation reactor, wherein said polycondensation feed forms a reaction medium in said reactor, wherein said polycondensation feed comprises PET having an average chain length in the range of from about 5 to about 50;
  (b) subjecting said reaction medium to a polycondensation reaction in said reactor, wherein said reactor comprises a substantially straight pipe, a flow divider disposed in said pipe, a first tray disposed in said pipe, and a second tray disposed in said pipe, wherein said pipe is oriented at a downward angle in the range of from about 10 to about 60 degrees below horizontal, wherein said pipe has a length-to-diameter (L:D) ratio in the range of from about 2:1 to about 50:1, wherein said first and second trays each have a length of at least about 0.25 L, wherein said flow divider divides said reaction medium into a first portion that flows on the bottom of said pipe, a second portion that flows on said first tray, and a third portion that flows on said second tray, wherein the mass flow rates of said first, second, and third portions are within about 50 percent of one another, wherein said first and second trays present respective first and second upwardly facing surfaces across which said second and third portions of said reaction medium flow respectively, wherein said first and second upwardly facing surfaces are each oriented within about 5 degrees of said downward angle of said pipe; and
  (c) recovering a predominately liquid polycondensation product from said reactor, wherein said polycondensation product comprises PET having an average chain length that is at least about 10 greater than the average chain length of the PET in said polycondensation feed.

36. The process of claim 35, wherein said first and second upwardly facing surfaces are oriented substantially parallel to said downward angle of said pipe, wherein said downward angle is in the range of from about 15 to about 45 degrees below horizontal.

37. The process of claim 35, wherein said flow divider at least partly defines a first outlet through which said first portion of said reaction medium flows, a second outlet through which said second portion of said reaction medium flows, and a third outlet through which said third portion of said reaction medium flows, wherein said flow divider at least partly defines first and second flow channels for directing said second and third portions of said reaction medium from the bottom of said pipe to said second and third outlets respectively.

38. The process of claim 37, wherein said flow divider comprises at least two upright walls, wherein said upright walls and the walls of said pipe cooperatively define at least a portion of said first and/or second flow channels.

39. The process of claim 38, wherein said flow divider comprises a substantially planar substantially horizontal plate sealing coupled to the inside of said pipe, wherein at least a portion of said reaction medium flows across at least a portion of said plate, wherein said upright walls are sealingly coupled to and extend upwardly from said plate.

40. The process of claim 35, wherein said first and second trays each comprise a substantially planar plate presenting substantially parallel edges that are sealing coupled to the inside of said pipe.

41. The process of claim 35, wherein said polycondensation feed is introduced into said reactor via a feed inlet located near the top of said reactor, wherein a vapor byproduct of said polycondensation reaction is discharged from said reactor via a vapor outlet located near the top and/or bottom of said reactor, wherein said polycondensation product is recovered from a liquid outlet located near the bottom of said reactor.

42. A reactor comprising: a downwardly sloped tubular member, a flow divider disposed in said tubular member, and a first tray disposed in said tubular member, wherein said tubular member is elongated along a central axis of elongation that is oriented at a downward angle in the range of from about 5 to about 75 degrees below horizontal, wherein said first tray extends at least one-quarter of the length of said tubular member and is spaced from the top and bottom of said tubular member, wherein said reactor defines a lower chamber located below said first tray and an upper chamber located above said first tray, wherein said flow divider at least partly defines a first outlet in fluid communication with said lower chamber and a second outlet in fluid communication with said upper chamber.

43. The reactor of claim 42, wherein said reactor comprises an undivided zone and a divided zone, wherein said flow divider separates said undivided and divided zones, wherein said undivided zone is located at a higher elevation than said divided zone, wherein said undivided zone does not contain said first tray, wherein said divided zone comprises said upper and lower chambers.

44. The reactor of claim 42, wherein said first tray presents an upwardly facing tray surface oriented within about 5 degrees of said downward angle of said tubular member.

45. The reactor of claim 44, wherein said upwardly facing tray surface is oriented substantially parallel to said downward angle of said tubular member, wherein said downward angle of said tubular member is in the range of from about 10 to about 60 degrees below horizontal.

46. The reactor of claim 42, wherein said flow divider presents a first upwardly facing divider surface that extends from the bottom of said tubular member to said second outlet.

47. The reactor of claim 46, wherein said first upwardly facing divider surface is substantially planar and orientated within about 10 degrees of horizontal.

48. The reactor of claim 46, wherein said flow divider comprises a first upright wall, wherein said first upright wall and said first upwardly facing divider surface cooperatively define at least a portion of a first flow channel extending from the bottom of said tubular member to said second outlet.

49. The reactor of claim 48, further comprising a second tray disposed in said tubular member above the bottom of said tubular member and below said first tray, wherein said reactor comprises an intermediate chamber located between said first and second trays, wherein said flow divider defines at least a portion of a third outlet in fluid flow communication with said intermediate chamber.

50. The reactor of claim 49, wherein said flow divider presents a second upwardly facing divider surface that extends from the bottom of said tubular member to said third outlet, wherein said flow divider comprises a second upright wall, wherein said second upright wall and said second upwardly facing divider surface cooperatively define at least a portion of a second flow channel extending from the bottom of said tubular member to said third outlet.

51. The reactor of claim 48, wherein said flow divider comprises a substantially planar substantially horizontal plate coupled to the inside of said tubular member, wherein said first upright wall is sealingly coupled to and extends upwardly from said plate.

52. The reactor of claim 42, wherein said first tray comprises a substantially planar plate presenting substantially parallel edges, wherein said substantially parallel edges are sealing coupled to the inside of said tubular member.

53. The reactor of claim 32, wherein said tubular member is a substantially straight pipe.

54. The reactor of claim 42, wherein said tubular member has a length-to-diameter (L:D) ratio in the range of from about 2:1 to about 50:1, wherein L is in the range of from about 10 to about 200 feet and D is in the range of from about 1 to about 20 feet.

55. The process of claim 25, further comprising removing a polycondensation product from a product outlet of said reactor, wherein said reaction medium forms said polycondensation product, wherein the It.V. of said PET in said polycondensation product is in the range of from about 0.3 to about 1.2 dL/g.

56. The process of claim 35, wherein the It.V. of said PET in said polycondensation feed is in the range of from about 0.1 and about 0.5 dL/g.

57. The process of claim 35, wherein the It.V. of said PET in said polycondensation product is in the range of from about 0.3 to about 1.2 dL/g.

58. The reactor of claim 42, wherein said reactor defines a feed inlet located near the top of said reactor, a vapor outlet located near the top and/or bottom of said reactor, and a liquid outlet located near the bottom of said reactor.

59. The process of claim 1, wherein said PET in said polycondensation feed has an It.V. in the range of from about 0.1 to about 0.5 dL/g.

60. The process of claim 1, further comprising removing a polycondensation product from a product outlet of said reactor, wherein said reaction medium forms said polycondensation product in said reactor, wherein the It.V. of said PET in said polycondensation product is in the range of from about 0.3 to about 1.2 dL/g.

* * * * *